United States Patent Office 3,271,384  
Patented Sept. 6, 1966

3,271,384  
PHENYL AZOBENZOYL PEROXIDES  
Howard C. Haas, Arlington, and Elbert M. Idelson, Newton Lower Falls, Mass., assignors to Polaroid Corporation, Cambridge, Mass., a corporation of Delaware  
No Drawing. Filed May 9, 1963, Ser. No. 279,330  
3 Claims. (Cl. 260—174)

This application is a continuation-in-part of our application Serial No. 122,611, filed July 10, 1961 (now abandoned).

The present invention is concerned with novel chemical compounds and more particularly with novel colored peroxides.

One object of the present invention is to provide novel colored peroxides.

Another object is to provide novel colored peroxides which are useful as polymerization initiators.

Still another object is to provide novel colored peroxides which are useful in novel photographic processes and products.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description.

The novel peroxides of this invention may be represented by the formula:

$$X-\underset{\underset{O}{\|}}{C}-O-O-\underset{\underset{O}{\|}}{C}-X$$

wherein each X is a phenylazo benzene radical in which the phenyl and benzene radicals may be substituted or unsubstituted. As examples of substituents which may be present on such radicals, mention may be made of alkyl, cyano, carboxy, halo and nitro groups.

A preferred compound within the scope of this invention is p,p'-bis-(phenylazo)-benzoyl peroxide of the formula:

$$\left[\text{C}_6\text{H}_5-\text{N}=\text{N}-\text{C}_6\text{H}_4-\underset{\underset{O}{\|}}{C}-O-\right]_2$$

The colored peroxides of this invention may be prepared from phenylazo-benzoic acids by converting such acids to the acid chloride with a reagent such, for example, as thionyl chloride, phosphorus trichloride or phosphorus pentachloride, and then reacting the acid chloride with a peroxide such, for example, as sodium peroxide. As examples of phenylazo-benzoic acids, mention may be made of p-phenylazobenzoic acid, p-(p'-methyl - phenylazo) - benzoic acid, p-(p'-cyano-phenylazo) - benzoic acid, p-(p' - dimethylamino - phenylazo)-benzoic acid, p-(m'-chlorophenylazo)-benzoic acid and p-(p'-carboxy-phenylazo)-benzoic acid.

Generally, the phenylazo-benzoic acids for use in the preparation of colored peroxides of this invention may be prepared by condensing phenyl nitroso compounds with appropriate phenyl amines in the presense of acetic acid as illustrated by the following reactions:

(1)

$$\text{C}_6\text{H}_5-\text{N}=\text{O} + \text{H}_2\text{N}-\text{C}_6\text{H}_4-\text{COOH} \xrightarrow{\text{acetic acid}}$$

$$\text{C}_6\text{H}_5-\text{N}=\text{N}-\text{C}_6\text{H}_4-\text{COOH}$$

and (2)

$$\text{C}_6\text{H}_5-\text{NH}_2 + \text{O}=\text{N}-\text{C}_6\text{H}_4-\text{COOH} \xrightarrow{\text{acetic acid}}$$

$$\text{C}_6\text{H}_5-\text{N}=\text{N}-\text{C}_6\text{H}_4-\text{COOH}$$

wherein the carboxy substituents may be ortho, meta or para to the nitroso or amino groups and wherein one or both of the phenyl radicals may be, if desired, further substituted by other substituents such, for example, as alkyl, alkoxy, phenoxy, halo, cyano, nitro, sulfo, carboxy, sulfone, ester, amido, carboamido, sulfonamido, etc., groups. The nitroso compounds for use in these reactions, may, in turn, be prepared by well-known reactions from the coresponding amine or nitro compounds, e.g., partial reduction of appropriate nitro compounds or partial oxidation of the appropriate amines.

As examples of amino, nitro and nitroso compounds useful in preparing the colored peroxides of this invention, mention may be made of p-aminobenzoic acid,
p-nitrobenzoic acid,
m-nitrobenzoic acid,
o-nitrobenzoic acid,
m-aminobenzoic acid,
o-aminobenzoic acid,
2-amino-3,5-diiodobenzoic acid,
2,5-dinitrobenzoic acid,
2-chloro-5-nitrobenzoic acid,
4-amino-3-nitrobenzoic acid,
3,4-dintrobenzoic acid,
4-nitrophthalic acid,
3-nitrophthalic,
nitroterephthalic,
5-aminoisophthalic,
aniline m-nitroaniline,
p-nitroaniline,
4-methyl-2-nitroaniline,
m-ethoxyaniline,
p-ethoxyaniline,
2,4-dichloroaniline,
p-aminoacetaniline,
o-methoxyaniline,
p-methoxyaniline,
m-aminobenzenesulfonic acid,
methyl o-aminobenzoate,
p-aminobenzene sulfonic acid,
o-methylaniline,
p-methylaniline,
3-amino-p-toluenesulfonic acid,
p-bromoaniline,
2-methyl-5-nitroaniline,
xylidines,
p-chloroaniline,
5-amino-o-toluenesulfonic acid,
o-chloroaniline,
o-nitroaniline,
2,4-dimethylaniline,
2,5-dimethylaniline,
2-bromo-4-methylaniline,
2,6-dichloro-4-nitroaniline,
p-iodoaniline,
ethyl p-amino-benzoate,
4-methoxy-2-nitroaniline,
4-ethoxy-2-nitroaniline,
2-methyl-5-isopropylaniline,
o-ethylaniline,
p-aminobenzonitrile,
2-amino-4-chloro-4-methylbenzene sulfonic acid, m-nitrotoluene,
p-nitrotoluene,
nitrobenzene,
1,4-dimethylnitrobenzene,
1-chloro-2-nitrobenzene,
1-iodo-4-nitrobenzene,
methyl-m-nitrobenzoate,
m-nitrobenzene sulfonic acid,
p-nitrophenyl ether,
4-chloro-2-nitroanisole,
1,4-dimethoxy-2-nitrobenzene
and nitrosobenzene.

The phenylazo-benzoic acids, which have been found particularly useful in preparing the compounds of this invention, are those in which the carboxy group is para to the azo radical. When such para compounds are employed, the phenylazo groups in the resulting compound will be para to the carboxyl peroxide radical, i.e.,

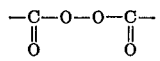

It should be understood that when desired the ortho and meta acids may be employed.

The following nonlimiting example illustrates the preparation of colored peroxides within the scope of this invention.

Example 1

1.5 g. of p-phenylazo-benzoyl chloride was dissolved in a minimum amount of acetone and added dropwise to a mixture comprising 125 ml. of acetone and 12.5 ml. of water which had been cooled in a methanol ice bath. 0.15 g. of sodium peroxide was added in small portions with stirring. The stirring was continued for an additional half hour and the mixture was poured into an ice and water bath. The product was filtered and recrystallized from benzene. The resulting p,p'-bis-(phenylazo)-benzoyl peroxide melted at 145 to 146° C. and showed the following elemental analysis:

Calculated for $C_{26}H_{18}N_4O_4$: C, 69.0%; H, 4.0%; N, 12.4%. Found: C, 69.7%; H, 4.2%; N, 11.8%.

The colored peroxides of this invention may be used as polymerization initiators which can be activated by visible light. In such a use, the colored peroxide is added to a polymerizable monomer and the combination is irradiated. Upon sufficient radiation, the colored peroxide decomposes to form free radicals which are used to initiate and propagate the polymerization. The p,p'-bis-(phenylazo)-benzoyl peroxide, produced above, when added to ethyl methacrylate monomer and exposed to visible light, produced polyethyl methacrylate.

The colored peroxides of this invention are particularly useful in various novel photographic processes. Thus, for example, the colored peroxides of this invention can be used to produce printing plates and relief images. In such a use, the colored peroxide may be applied along with a suitable monomer to a film support. The photosensitive element thus prepared is irradiated, for example, through a photographic negative or some other means with visible light to produce a polymeric image in exposed areas. The film is then washed with a solvent, which dissolves the unreacted monomer from unexposed areas but not the polymer in exposed areas. The resulting relief image may then be inked and used as a printing plate. Multicolor printing plates can be prepared through such processes, for example, by using a camera wherein separate plates, directed to different portions of the spectrum, are concurrently but individually exposed and then processing the individual plates as set forth above. Multicolored printing plates can be further prepared, for example, by using separable negatives. Thus, for example, one layer may comprise a first colored peroxide, which has a maximum absorption for one primary color, a second layer may comprise a second colored peroxide, which has a maximum absorption for a second primary color, and a third layer may comprise a third colored peroxide which has a maximum absorption for the third primary color Upon exposure, the color peroxides act in a manner similar to sensitizing dyes and three polymeric images are formed, the first image being a polymeric record of impinging light within the first primary area, the second image being a polymeric record of the impinging light within the second primary area and the third image being a polymeric record of the impinging light within the third primary area. Subsequent to exposure, the layers may be separated from one another and washed with a solvent to remove the unpolymerized matter from unexposed areas. Upon inking with appropriate inks, the plates thus prepared may be used to print multicolored images.

The colored peroxides of this invention are also especially useful in photographic diffusion-transfer processes wherein they may be used to control the transfer of color-providing substances. Thus, for example, the colored peroxide may be used, in combination, with a monomer which, when polymerized, is formed into a mordant for a color-providing substance, e.g., a dye. In such an embodiment, a photosensitive element comprising a colored peroxide, the monomer and a color-providing substance is prepared and irradiated with visible light. In exposed areas, the free radicals produced from the colored peroxides initiate polymerization and produce a polymeric mordant for the color-providing materials in such areas. In unexposed areas, a mordant for the color-providing substances would not be produced and such substances would be free to transfer. Thus, for example, by wetting the photosensitive element with a solvent for the color-providing substances and superposing the photosensitive element on an image-receiving element, a transfer image may be obtained. In a still further embodiment of such processes, the colored peroxides instead of producing a mordant may be used to produce a polymeric barrier through which the color-providing substances cannot permeate. In such an embodiment, the color-providing substances in unexposed areas would be free to migrate to a superposed image-receiving element to form a transfer image thereon.

Such colored peroxides are further useful in multicolored diffusion-transfer processes. In such processes, for example, peroxides having maximum absorptions within the three primary colors of the spectrum may be used and such peroxides may be used to control the transfer of color-providing substances which are complementary in color to such primary colors. Thus, for example, a separable multilayer photosensitive element may be employed wherein one of the separable layers may comprise a first colored peroxide and have a first complementary color-providing substance associated with it. A second separable layer may comprise a second colored peroxide and have a second complementary color-providing substance associated with it and a third layer may comprise a third colored peroxide and have a third complementary color-providing substance associated with it. Upon exposure, polymeric images are formed in each of the layers which, as in the printing plates, correspond to the amount of each type of light impinging on the negative, and the three layers are separated and superposed one after another, in the presence of a suitable solvent on a common image-receiving element, to form the transfer image thereon. In a further embodiment, the separated layers may be superimposed on individual transparent image-receiving elements and the multicolor image can be made by superposing the individual image-receiving elements on one another. The transfer or nontransfer of the dyes in such multicolored diffusion transfer processes can be controlled, for example, by polymeric mordants or polymeric barriers as set forth above. If desired, a camera, which concurrently exposes individual photo-sensitive elements, may be employed in place of the separable negatives.

Multicolored transfer images may be produced from the above processes by a single superposing of the negative on a common image-receiving element by employing screen-type negatives similar to those disclosed in U.S. Patent No. 2,968,554 to Edwin H. Land. Generally, such screen-type negatives will comprise a plurality of at least first and second minute, individual photosensitive elements arranged alongside one another on a common support. The first elements in general will comprise a first colored peroxide and a monomer and have associated with them first color-providing substances. The second elements will in general comprise a second colored peroxide, and a monomer, and will have associated with them second color-providing substances. The transfer of the color-providing substances may be controlled, as set forth above, by polymeric mordants, barriers, etc., produced in the polymerization.

Since certain changes may be made in the above product without departing from the scope of the invention herein involved, it is intended that all matter contained in the above description shall be interpreted as illustrative and not in a limiting sense.

What is claimed is:
1. A compound represented by the formula:

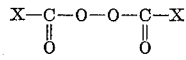

wherein each X is a phenylazo benzene radical.

2. A compound as defined in claim 1 wherein the azo radicals of said phenylazo benzene radicals are para to the carboxyl peroxide radical

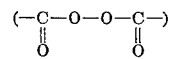

3. p,p'-Bis-(phenylazo)-benzoyl peroxide.

No references cited.

CHARLES B. PARKER, *Primary Examiner.*

N. S. MILESTONE, D. M. PAPUGA,
*Assistant Examiners.*